United States Patent [19]

Fisher

[11] 4,097,181
[45] Jun. 27, 1978

[54] ROTARY CUTTING TOOL

[76] Inventor: Ted J. Fisher, 1322 Barhart Rd., Poplar Bluff, Mo. 63901

[21] Appl. No.: 774,782

[22] Filed: Mar. 7, 1977

[51] Int. Cl.² .................. B23B 27/00; B23B 51/00
[52] U.S. Cl. .................... 408/187; 407/81; 407/89; 407/92; 408/197
[58] Field of Search .......... 29/98; 408/159, 180, 408/187, 188, 197, 233; 407/81, 89, 92

[56] References Cited

U.S. PATENT DOCUMENTS

| 1,219,097 | 3/1917 | Gibbs | 408/188 X |
| 1,438,368 | 12/1922 | Dorrans | 29/98 |
| 1,476,262 | 12/1923 | Marshall | 29/98 |

FOREIGN PATENT DOCUMENTS

| 521,114 | 5/1940 | United Kingdom | 29/98 |

Primary Examiner—Robert Louis Spruill
Attorney, Agent, or Firm—Koenig, Senniger, Powers & Leavitt

[57] ABSTRACT

A rotary cutting tool having a shank and a head at one end of the shank, the head having a flat bed portion. A clamp for carrying a bit is mounted for rotation on the bed portion for angular adjustment of the bit relative to the bed portion. This clamp has a groove in one of its faces, the bit being axially slidable therein to different extended positions, and the groove has a depth less than the thickness of the bit such that the bit projects laterally from the groove for engagement with the bed portion. As the clamp is drawn toward the bed portion, the bit is clamped in the groove against the bed portion in any predetermined adjusted angular and extended position.

3 Claims, 4 Drawing Figures

ROTARY CUTTING TOOL

BACKGROUND OF THE INVENTION

This invention relates to cutting tools and more particularly to an adjustable rotary cutting tool.

Rotary cutting operations commonly utilized during the machining stage of a manufacturing process include such operations as boring, chamfering, trepanning, grooving and what is commonly referred to in the trade as fly cutting, i.e., a milling operation for reducing the thickness of a workpiece. Heretofore, in order to perform such operations, a particular cutting tool (which carries a tool bit) was selected depending on the particular type and size of the cut to be made and then mounted for rotation on a suitable cutting machine, such as a milling machine, for making a cut. Rotary cutting tools, however, were limited in their adjustability for making cuts of different sizes. With regard to the fly cutting operation, for example, a particular cutting tool was designed to make a cut of only one particular width (e.g., 1 inch), rather than being adjustable for making a cut of any desired width within a certain range. This, of course, has made it necessary for the machinist to acquire a plurality of different tools resulting in a considerable and undue expense. Moreover, the constant need to change cutting tools for making the necessary but different cuts on a workpiece consumed an excessive amount of the machinist's time and effort. Rotary cutting tools are shown in U.S. Pat. Nos. 63,673, 914,966, and 2,582,574.

SUMMARY OF THE INVENTION

Among the several objects of this invention may be noted the provision of an improved and versatile rotary cutting tool which is fully and accurately adjustable to the proper cutting position for making a cut of any desired size within a certain range; the provision of such a tool which is quickly and easily adjustable to the proper cutting position; the provision of such a cutting tool which remains securely locked in its adjusted position throughout a machining operation; and the provision of such a tool which is simple in design, economical in construction and has relatively few parts for ease in maintenance.

Briefly, a rotary cutting tool of the present invention comprises a shank, a head at the forward end of the shank, the head having a flat bed portion, and means for mounting a bit on the bed portion. This means comprises a clamp for carrying the bit, the clamp being mounted for rotation on the bed portion about an axis generally perpendicular to the bed portion for angular adjustment of the bit relative thereto. The clamp has a groove in one of its faces with the bit being axially slidable therein to different extended positions, and the groove has a depth less than the thickness of the bit such that the bit projects laterally from the groove for engagement with the bed portion. Means for drawing the clamp toward the bed portion is also provided thereby to clamp the bit in the groove against the bed portion in any predetermined adjusted angular and extended position. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
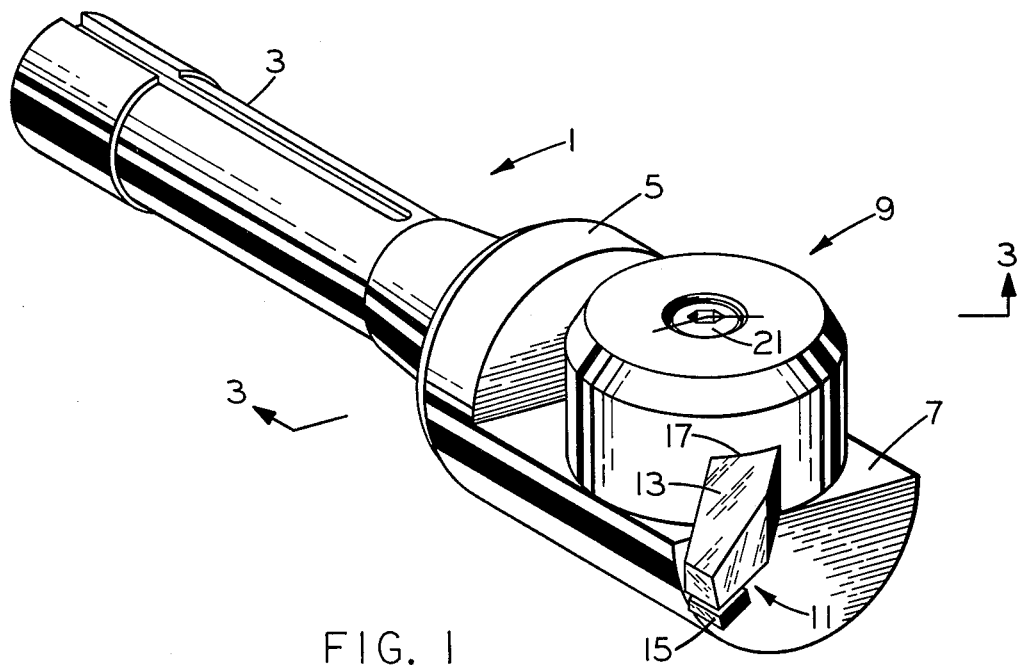
FIG. 1 is a perspective of the rotary cutting tool of this invention.
Figure 2:
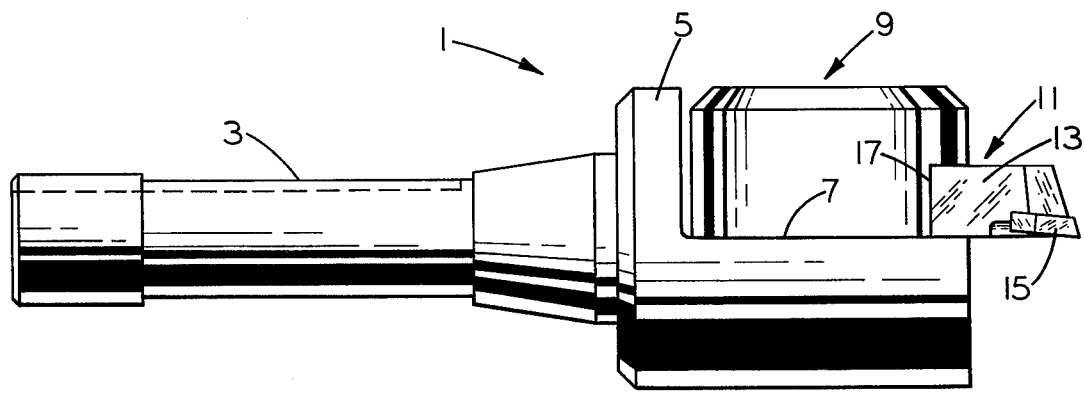
FIG. 2 is a side elevation of the tool of FIG. 1.
Figure 3:
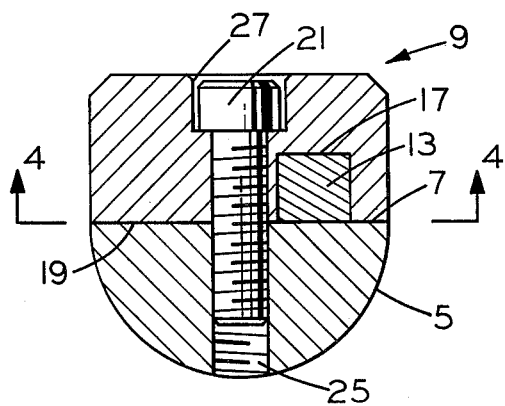
FIG. 3 is a section on line 3—3 of FIG. 1.

Referring to the drawings, particular to FIG. 1, a rotary cutting tool of this invention is generally indicated at 1 and is shown to include an elongated shank 3 suited to fit a Bridgeport milling machine, although it will, of course, be understood that the shank may be of any standard design for fitting the chuck and spindle of any milling machine or other suitable cutting machine such as a numerically controlled milling machine. The shank 3 has at its forward end (the right end as viewed in FIGS. 1 and 2) a tool head 5 which is generally cylindrical in shape and coaxial with shank 3. The head 5 has a flat smooth bed portion 7 formed by a notch extending rearwardly from the forward end of the head 5, this notch having a width approximately equal to the diameter of the tool head and a depth approximately equal to one-half the diameter of the head. A cylindrically shaped swivel clamp indicated generally at 9 constitutes means for mounting a bit generally shown at 11 on the bed portion 7, the bit 11 consisting of a rectangularly shaped shank 13 and a tungsten carbide cutting edge 15 at the outer end of the shank.

More particularly, clamp 9 has a groove 17 in its face 19 adjacent the bed portion 7 for carrying the shank 13 and is mounted for rotation on the bed portion about an axis generally perpendicular to the bed portion for angular adjustment of the bit 11 relative thereto. In addition to this angular adjustment feature, the bit 11 is also axially slidable in the groove 17 to different extended positions, thus providing double adjustment of the bit relative to the bed portion 7 and a workpiece to be machined.

Figure 4:
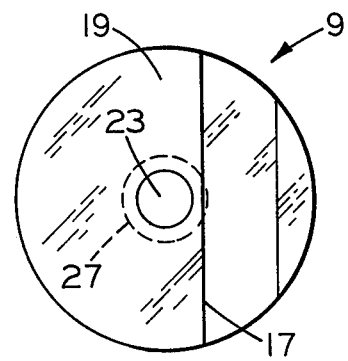
FIG. 4 is a section on line 4—4 of FIG. 3 illustrating the clamp portion of the tool of this invention, the tool bit being removed to show the groove in the clamp.

As shown best in FIG. 4, groove 17 extends completely across the face 19 of swivel clamp 9 and is offset from the axis of rotation of the clamp for providing more versatility to the cutting tool. For example, the fact that the groove is offset enables the tool to make a wider range of cuts without excessive bit "overhang" (i.e., the distance the bit extends outwardly from the clamp 9). In this regard, undue overhang reduces the requisite rigidity of the bit.

The groove 17 has a depth less (e.g., approximately 0.02-inch less) than the thickness of shank 13 so that the shank projects from the open side of the groove by that amount for frictional engagement with the bed portion 7. The groove 17 might have, for example, a depth of 0.480-inch for accommodating a standard 0.5-inch bit. A heavy Allen-head machine screw 21 received in a hole 23 in a clamp 9 and threaded into a tapped bore 25 in head 5 constitutes means for rotatably mounting the swivel clamp 9 on the bed portion 7 and also serves as means for drawing the clamp toward the bed portion so as to frictionally clamp the bit 11 in the groove 17 firmly against the bed portion in any predetermined angular and extended position. The head of screw 21 is received in a counterbore 27 at the upper end of bore 23.

In operation, the cutting tool of the invention is mounted on a milling machine or other suitable type of cutting machine for performing the desired rotary cutting operation. In this regard, this cutting tool 1 is capable of performing a variety of cutting operations, including fly cutting, spotfacing, chamfering, boring, trepanning and grooving, as well as other operations. After the cutting tool has been appropriately mounted, the bit 11 is fully and accurately adjustable relative to the workpiece for making a cut of any desired size within a certain range (e.g., a 2.125 – 6-inch diameter bore or a 0.5 – 5-inch wide cut) by cooperatively swiveling the clamp 9 to the desired angular position and sliding the bit in groove 17 to its proper extended position. The proper position of the bit relative to the workpiece will, of course, depend upon the operation to be performed and the size of cut to be made and will be well known to those in the machining art. The screw 21 is then tightened for drawing the clamp toward the bed portion 7 of the tool head 5 so as to firmly clamp the bit against the bed portion and lock it in its adjusted angular and extended position throughout the entire cutting operation. After the particular operation has been performed (e.g., a fly cutting operation), the bit 11 may be quickly and easily readjusted in the manner described above to any desired angular and extended position for making a new cut of a different width. If an entirely different operation, such as a boring operation, is to be performed, bit 11 is replaced, if necessary, by simply loosening the swivel clamp 9 and substituting therefor another standard 0.5-inch bit having a cutting edge suitable for that operation.

The double adjustment feature of the tool of this invention is additionally advantageous in that the bit can be so adjusted relative to the workpiece that maintenance of the bit (grinding, etc.) is minimized.

The simple design and relatively few parts of the improved cutting tool of this invention assures economical construction and maintenance of the tool.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A rotary cutting tool having a shank, a generally cylindrical head at one end of the shank constituting its forward end, said head having a flat bed portion formed by a notch extending rearwardly from the forward end of the head, said notch having a width approximately equal to the diameter of the head and a depth approximately equal to one-half said diameter, and means for mounting a bit on the bed portion, said mounting means comprising a clamp generally cylindrical in shape for carrying the bit, said clamp being mounted on the bed portion by a threaded fastener extending through an axial hole in the clamp and into a tapped bore in the bed portion, the clamp being rotatable with respect to the bed portion for angular adjustment of the bit relative to the bed portion, said clamp having a groove therein offset and separate from said axial hole and extending completely across one face of the clamp with said bit being axially slidable in the groove to different extended positions, said groove having a depth less than the thickness of the bit such that the bit projects from the open side of the groove for engagement with said bed portion whereby on tightening said fastener the clamp is drawn toward the bed portion thereby rigidly to clamp the bit in said groove against the bed portion in any predetermined adjusted angular and extended position.

2. A rotary cutting tool as set forth in claim 1 wherein said groove has a depth approximately 0.02-inch less than the thickness of the bit.

3. A rotary cutting tool as set forth in claim 1 wherein said shank is elongate and said head is coaxial with the shank.

* * * * *